Nov. 1, 1966     H. URMONEIT     3,283,267
INDUCTIVE COUPLING DEVICE WITH A ROTATABLE AND A STATIONARY
COUPLING LOOP, AND METHOD OF ITS APPLICATION
Filed Nov. 25, 1964     2 Sheets-Sheet 1

$H_x = H_{max} \cdot \cos \varphi$

INVENTOR.
HORST URMONEIT

INVENTOR.
HORST URMONEIT

United States Patent Office 3,283,267
Patented Nov. 1, 1966

3,283,267
INDUCTIVE COUPLING DEVICE WITH A ROTATABLE AND A STATIONARY COUPLING LOOP, AND METHOD OF ITS APPLICATION
Horst Urmoneit, Kleinmachnow, Germany, assignor to VEB Halbleiterwerk, Frankfurt an der Oder, Stahnsdorf, Germany
Filed Nov. 25, 1964, Ser. No. 413,708
9 Claims. (Cl. 333—24)

This invention relates generally to inductive coupling devices and more specifically to an improved coupling arrangement for said devices, wherein the electromagnetic field coupling the elements within said devices can be controlled over a wide range of values.

Normally the method of varying the amount of electromagnetic coupling to a stationary conductor consists of placing an inductive coupling loop in close proximity and parallel to the conductor and either varying the distance of the coupling loop from the conductor, or rotating the coupling loop on an axis perpendicular to the conductor. The amount of coupling between an inductive loop and the conductor varies as the cosine of the angle between the loop surface and the conductor plane, assuming the distance between the two to be held constant. Since the coupling of a rotating loop is, with respect to a stationary conductor, proportional to a cosine function, it is inherent that the coupling will decrease rapidly for small changes in angular displacement as the coupling angle approaches 90 degrees.

It is, therefore, an object of this invention to provide an improved means and method therefor for controlling the amount of coupling between an inductive loop arrangement and a stationary conductor by varying the angle between the loop surface and the conductor plane.

It is a further object of this invention to provide a means for reducing the large change in magnitude of the coupling with respect to small incremental changes in coupling angle for coupling angles approaching 90 degrees. Other objects and advantages of the present invention will become apparent on careful consideration of the following detailed description when taken in conjunction with the accompanying drawings, in which.

In the figures, similar reference characters have been used to designate corresponding elements of the invention.

Figure 1:
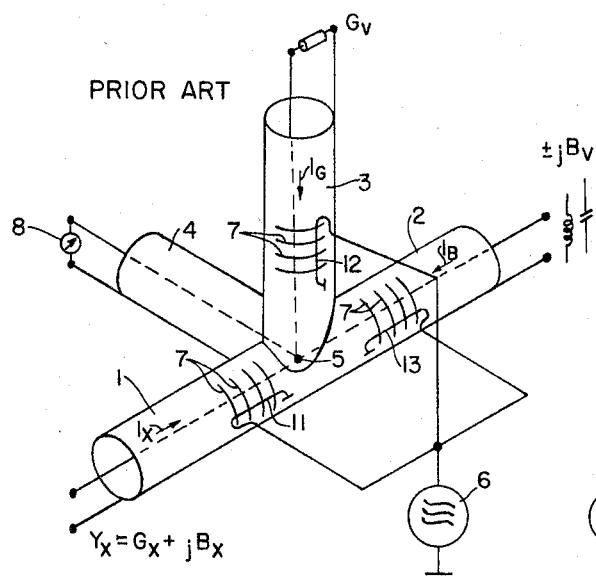
FIG. 1 is a four branch coaxial bridge arrangement containing inductive loop coupling.

The operation of the inventive device and the advantages associated therewith will be best explained with reference to a practical example describing the operation of a known inductive coupling loop. One example of the application of rotatable inductive coupling loops appears in FIG. 1 showing the principle of a Thurston comparator. The comparator is connected in a coaxial bridge arrangement and allows the measurement of two and four pole magnitudes of electromagnetic energy in the high frequency range. It consists of coaxial branches 1, 2, 3 and 4 each containing a centrally located coaxial conductor which meet at a junction point 5. A signal generator 6 is connected to coupling loops 11, 12 and 13. The outer conductor of these loops has been omitted for the purposes of better illustration.

The loops are rotatably mounted with respect to the center conductor of coaxial branches 1, 2 and 3 so that the amount of coupling between the loops and the center conductor may be altered by way of coupling slits 7 in the coaxial branches. The conductor of coaxial branch 4 is connected to a zero type instrument 8 to indicate bridge balancing at the junction point 5.

The unknown admittance of the bridge $Y_x$ is measured at the center conductor of coaxial branch 1 and is shown equal to $G_x + jB_x$. $G_v$ is the comparative conductance value fixed at coaxial branch 3 and is equal to $Y_o$, the admittance of the coaxial line in the branches. The quantity $jB_v$, fixed at coaxial branch 2, is the comparative susceptance and is equal to $\pm jY_o$. It can be represented by a short circuit conductor having an adjustable length of approximately ⅛ of a wave length. Loop currents $I_s$ flow through the coupling loops.

The voltages induced in the center conductors of the coaxial branches are $E_x$, $E_G$ and $E_B$ corresponding to branches 1, 3 and 2 respectively. The currents in the three conductors depend upon the terminations shunted across them. Furthermore the coupling between the loops and the three conductors can be varied. The coupling is proportional to the cosine of the angle between the loop surface and the conductor plane if the distance is held constant.

The currents in each of the three conductors are debranches 1, 2 and 3, respectively.

$$I_x = Y_x E_x = Y_x(-j\omega M_x I_s) = Y_x M_x \cos \varphi_{11}(-j\omega I_s) \quad (1)$$

$$I_g = Y_o E_G = Y_o(-j\omega M_G I_s) = Y_o M_G \cos \varphi_{12}(-j\omega I_s) \quad (2)$$

$$I_b = \pm jY_o E_B = \pm jY_o(-j\omega M_B I_s)$$
$$= \pm jY_o M_B \cos \varphi_{13}(-j\omega I_s) \quad (3)$$

$M_x$, $M_b$ and $M_g$ represent the mutual inductances of branches 1, 2 and 3, respectively.

Under the conditions of Equations 1, 2 and 3, the conductors in each of the coaxial branches of the bridge, may be equalized for a particular angular position where the current at the junction point is equal to zero. When meter 8 indicates zero, Equations 1, 2 and 3 can be reduced to Equations 4 and 5, representing $G_x$ and $B_x$, the components of the unknown admittance $Y_x$ of the bridge, as a function of the coupling angles of loops 11, 12 and 13.

$$G_x = G_v \frac{\cos \varphi_{12}}{\cos \varphi_{11}} \quad (4)$$

$$B_x = B_v \frac{\cos \varphi_{13}}{\cos \varphi_{11}} \quad (5)$$

Angles $\varphi_{11}$, $\varphi_{12}$ and $\varphi_{13}$ represent the coupling angles of inductive loops 11, 12 and 13 with respect to the center conductors of branches 1, 2 and 3. The angle $\varphi_{11}$ represents the multiplication factor of both equations. The angle $\varphi_{12}$ represents the unknown conductance $G_x$ and $\varphi_{13}$ represents the unknown susceptance $B_x$ of the bridge.

Figure 2:
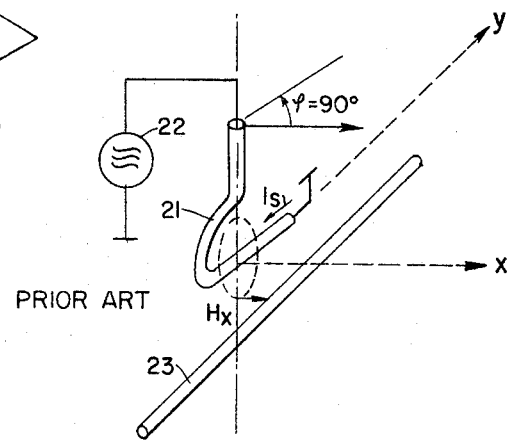
FIG. 2 is a single inductive loop connected in close proximity to a coaxial conductor.

FIG. 2 is a known arrangement which includes a coupling loop 21, a generator 22, and a center conductor 23. The field component $H_x$ generated by the coupling loop 21 induces maximum voltage into conductor 23 when positioned in the Y axis direction.

As loop 21 is rotated 90 degrees toward the X axis, the effective component of $H_x$ coupling conductor 23 is reduced in proportion to the cosine of the angle displaced by loop 21. Since the current in the center conductor is directly proportional to the field coupling the conductor, the current is also reduced in the same manner.

Figure 3:
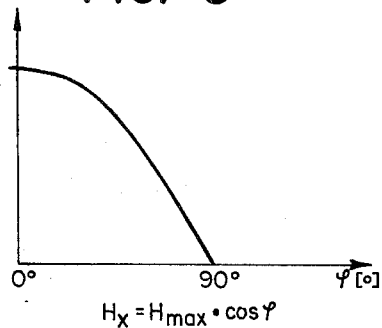
FIG. 3 is a plot of the electromagnetic field with respect to the coupling angle for the arrangement of FIG. 2.

If a small admittance or a large resistance value is to be measured with the measuring bridge of FIG. 1, a small current has to be induced in the center conductor to achieve equalization. According to FIG. 3 however, at coupling angles approaching 90 degrees, the gradient comprising the change in the field $H_x$ with respect to the change in coupling current is large with respect to the gradient at smaller coupling angles. The smallest current that can be coupled into the center conductor is therefore dependent upon the smallest adjustable or readable coupling angle that can be defined at 90 degrees. It is therefore of importance to be able to couple small currents into the center conductor of the bridge and to provide a means of reading the coupling angle dependent upon these small currents, on an expanded scale or range. It is, therefore, the purpose of this invention to enlarge the measuring range of the coupling angle both at higher coupling or admittance values and particularly at lower coupling or admittance values.

Figure 4:
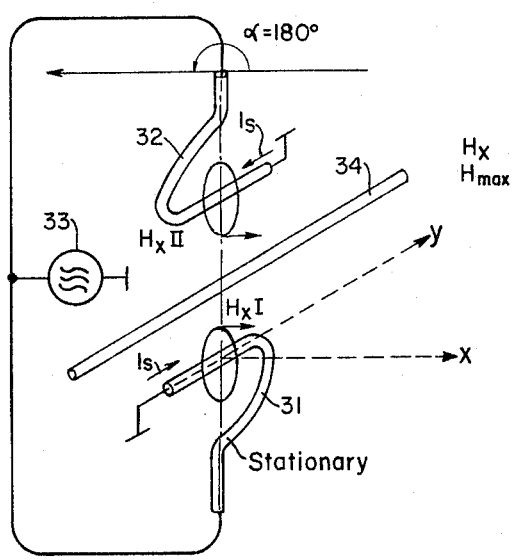
FIG. 4 is an improved coupling arrangement according to the invention for coupling electromagnetic energy to a coaxial conductor.

The invention is best explained by referring to the coupling arrangement of FIG. 4. The field coupling a center conductor 34 consists of the sum of the electric fields generated by inductor loops 31 and 32.

Inductor loop 31 is rigidly mounted parallel and in close proximity to stationary conductor 34. Inductive loop 32 is rotatably mounted in close proximity to stationary conductor 34 and can be rotated on an axis perpendicular to the x–y plane through an angle of 180 degrees. Both inductive loops are connected in the same phase relationship to a generator 33. Inductive loop 32 is located at a predetermined distance from conductor 34 so that its electric field will cancel the electric field of inductive loop 31 when loop 32 is rotated to angle of 180 degrees. The cancelling of the two electric fields will produce a net electric field of zero coupling conductor 34.

Figure 5A:
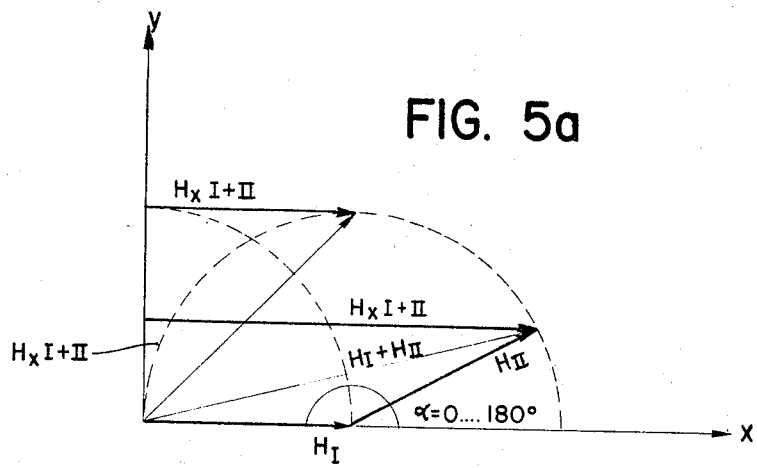
FIG. 5a is a vector diagram of the relationship between the coupling fields of the arrangement of FIG. 4 and their displacement with respect to the X and Y axes.

FIG. 5a illustrates in vector form, the magnitude of the resulting field coupling center conductor 34 with respect to the position of inductive loop 32 in the x–y plane.

Figure 5B:
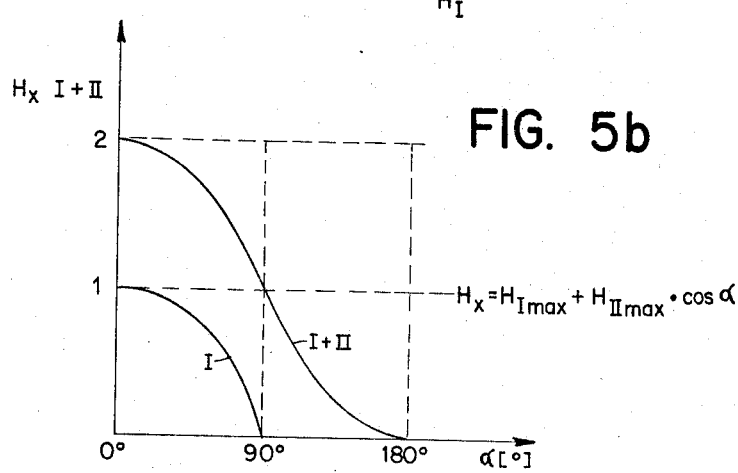
FIG. 5b is a plot of the electromagnetic fields with respect to the coupling angle of the arrangement of FIG. 4.

FIGURE 5b illustrates the magnitude of the field coupling conductor 34 with respect to the coupling angle of loop 32, identified as $H_xI+II$, in comparison with the coupling field of a single inductive loop which with respect to its coupling angle, identified as $H_xI$. It can be seen from FIGURE 5b that the embodiment of FIG. 4 has significantly reduced the large gradient representing the change in electromagnetic field with respect to coupling angle, particularly for small currents induced in conductor 34 by the field $H_x$. The following calculations were made to illustrate the overall widening of the measuring range of the coupling angle.

$$H_x = H_{max} \cdot \cos 88°$$

$$H_x = H_{max} \cdot 0.0349 \tag{6}$$

$$H_x = H_{max}(1 + \cos 178°)$$

$$H_x = _{max} \cdot 0.0006 \tag{7}$$

Equation 6 illustrates the electric field determined for a single inductive loop.

Equation 7 illustrates the magnitude of the field of two inductive loops for the same angular difference of 2 degrees employed in the single inductive loop calculations. It can be seen from a comparison of these equations that the magnetic coupling has been reduced by a factor of 58 for the same angular displacement of the coupling loop. This reduction in turn corresponds to an increase in the measuring range of the coupling angle.

Additional embodiments of the inventive loop arrangement are shown in FIGS. 6a through 6d. In general, loop 41 is held stationary. Loop 42 is rotatively mounted and can rotate through an angle of 180 degrees with respect to axis 44. The three embodiments are distinguished by the different arrangement of the coupling loops with respect to stationary conductor 43.

Figure 6A:
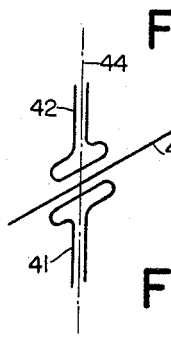
FIGS. 6a, b, c and d illustrate additional coupling improvements of the present invention.

FIG. 6a, loops 41 and 42 consist of a pair of dipoles mounted parallel to conductor 43. The loops are symmetrically shaped and disposed symmetrically in their initial starting position with respect to the center conductor and to each other.

Figure 6B:
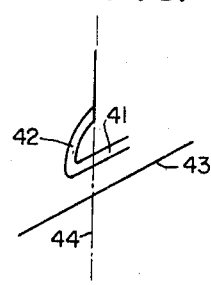

In FIG. 6b, loops 41 and 42 are arranged on one side of the conductor 43 so that loop 41, loop 42 and center conductor 43 are within the same plane when in the starting position.

Figure 6C:
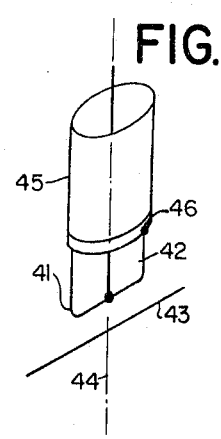

In FIG. 6c, loop 41 is rigidly connected with the outer conductor 45 and the loop 42. Loop 42 is connected to rotatable ring 46 which is in contact with conductor 45. Loop 42 together with the ring 46 can rotate around axis 44, through an angle of 180 degrees.

Figure 6D:
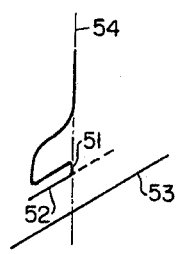

In FIG. 6d, the loop is comprised of two portions, a stationary portion 51, and a movable portion 52. In the position illustrated, the electric fields of both are balanced and thereby cancel out. However, if loop 52 is rotated 180 degrees to the position shown in the broken line, maximum coupling of conductor 53 is achieved.

Although certain specific embodiments of this invention have been disclosed and described, it is to be understood that they are merely illustrative of this invention and modifications may of course be made without departing from the spirit and scope of the invention as defined in the appended claims.

What I claim is:

1. A device for adjusting the inductive coupling of a high-frequency electromagnetic field to a stationary conductor, comprising first coupling means rigidly mounted adjacent to said conductor and having a first electromagnetic field in contact with said conductor, rotatively mounted second coupling means having a second electromagnetic field also in contact with said conductor, and means for rotating said second coupling means on an axis perpendicular to said conductor so that said second electromagnetic field will substantially cancel said first electromagnetic field at one position of rotation so that the resultant electric field coupling said conductor is substantially reduced to zero at said position.

2. A device as defined in claim 1, wherein said first coupling means is electrically connected to said second coupling means.

3. A device as defined in claim 2, wherein said coupling means comprise single wire inductive loops.

4. An inductive coupling device for adjusting a high-frequency electromagnetic field coupling a stationary conductor, comprising a first inductive wire loop rigidly mounted adjacent to and in the plane containing said conductor, a rotatively mounted second inductive wire loop electrically connected to said first loop and disposed opposite to and in said plane containing said first loop and said conductor, a high-frequency signal generator electrically connected to said loops and supplying an electromagnetic field thereto, and means for rotating said second loop through an angle of approximately 180 degrees of arc on an axis perpendicular to said conductor so that the electromagnetic field of said second loop coupling with said conductor will substantially cancel at one position of rotation the electromagnetic field of said first loop coupling said conductor so that the resultant electric field coupling said conductor is substantially reduced to zero at said position.

5. A device as defined in claim 4, wherein said first and second loops are symmetrically shaped dipoles.

6. An inductive coupling device for adjusting a high frequency electromagnetic field coupling a stationary conductor, comprising a first inductive wire loop rigidly mounted adjacent to and in the plane containing said conductor, a second inductive wire loop electrically connected to said first loop and disposed adjacent to and in said plane containing said first loop and said conductor, a high-frequency signal generator electrically connected to said loops and supplying an electromagnetic field thereto, and means for rotating said second loop through an angle of approximately 180 degrees of arc on an axis perpendicular to said conductor so that the electromagnetic field of said second loop coupling with said conductor will substantially cancel at one position of rotation the electromagnetic field of said first loop coupling said conductor so that the resultant field coupling said conductor is substantially reduced to zero at said position.

7. An inductive coupling device for adjusting a high frequency electromagnetic field coupling a stationary conductor comprising a rigid coaxial transmission line having a center conductor and an outer shield surrounding said center conductor and disposed in a plane perpendicular to said stationary conductor, a rigidly mounted first inductive wire loop connected at one end of said coaxial line across said center conductor and outer shield and contained in the same plane and adjacent to said stationary conductor, a rotatively mounted ring electrically connected to said outer shield at the end of said coaxial line and having an axis of rotation contained within said center conductor, a second wire loop having one end pivotally mounted at the end of said center conductor and the opposite end connected to said ring, a high frequency signal generator electrically connected to one end of said coaxial line to provide an electromagnetic field to both said wire loops, and means for rotating said ring through an angle of 180 degrees of arc on an axis contained by said center conductor so that the electric field produced by said second loop affixed to said ring can be so positioned with respect to the electric field produced by said first loop that the resultant field in contact with said stationary conductor is substantially reduced to zero at one position of rotation of said ring.

8. A method, employing a coaxial bridge having four branches, for determining the angle of coupling of electromagnetic energy between its stationary center conductor and a pair of adjacent coupling loops mounted parallel to said conductor and contained within each branch of said bridge, comprising the steps of energizing the coupling loops equally and in phase with an electromagnetic field, rotating one loop on an axis perpendicular to the center conductor through an angle of approximately 180 degrees of arc so that the field of the one loop substantially cancels at one position of rotation, the field of the other loop and the resultant field coupling the center conductor is substantially reduced to zero at said position, and measuring the angle displaced by the rotated loop with respect to the center conductor when the field is substantially reduced to zero.

9. A method, employing a coaxial bridge having four branches, for determining the angle of coupling of electromagnetic energy between its stationary center conductor and a pair of oppositely disposed coupling loops mounted parallel to said conductor and contained within one branch of said bridge, comprising the steps of energizing the coupling loops equally and in phase with an electromagnetic field, rotating one loop on an axis perpendicular to the center conductor through an angle of approximately 180 degrees of arc so that the field of the one loop, at one position of rotation, substantially cancels the field of the other loop and the resultant field coupling the center conductor is substantially reduced to zero at said position, and measuring the angle displaced by the rotated loop with respect to the center conductor when the field is substantially reduced to zero.

References Cited by the Examiner

Soderman, R. A.: "Impedance Measurements in the 50 to 2000 mc. Range," Radio-Electronic Engineering, 7–1951 (General Radio Type 1602–A).

HERMAN KARL SAALBACH, *Primary Examiner.*

R. D. COHN, *Examiner.*